(No Model.)
G. BORTMANN & R. MUNKWITZ.
DAMPER DEVICE FOR MECHANICAL MUSICAL INSTRUMENTS.
No. 599,681. Patented Mar. 1, 1898.
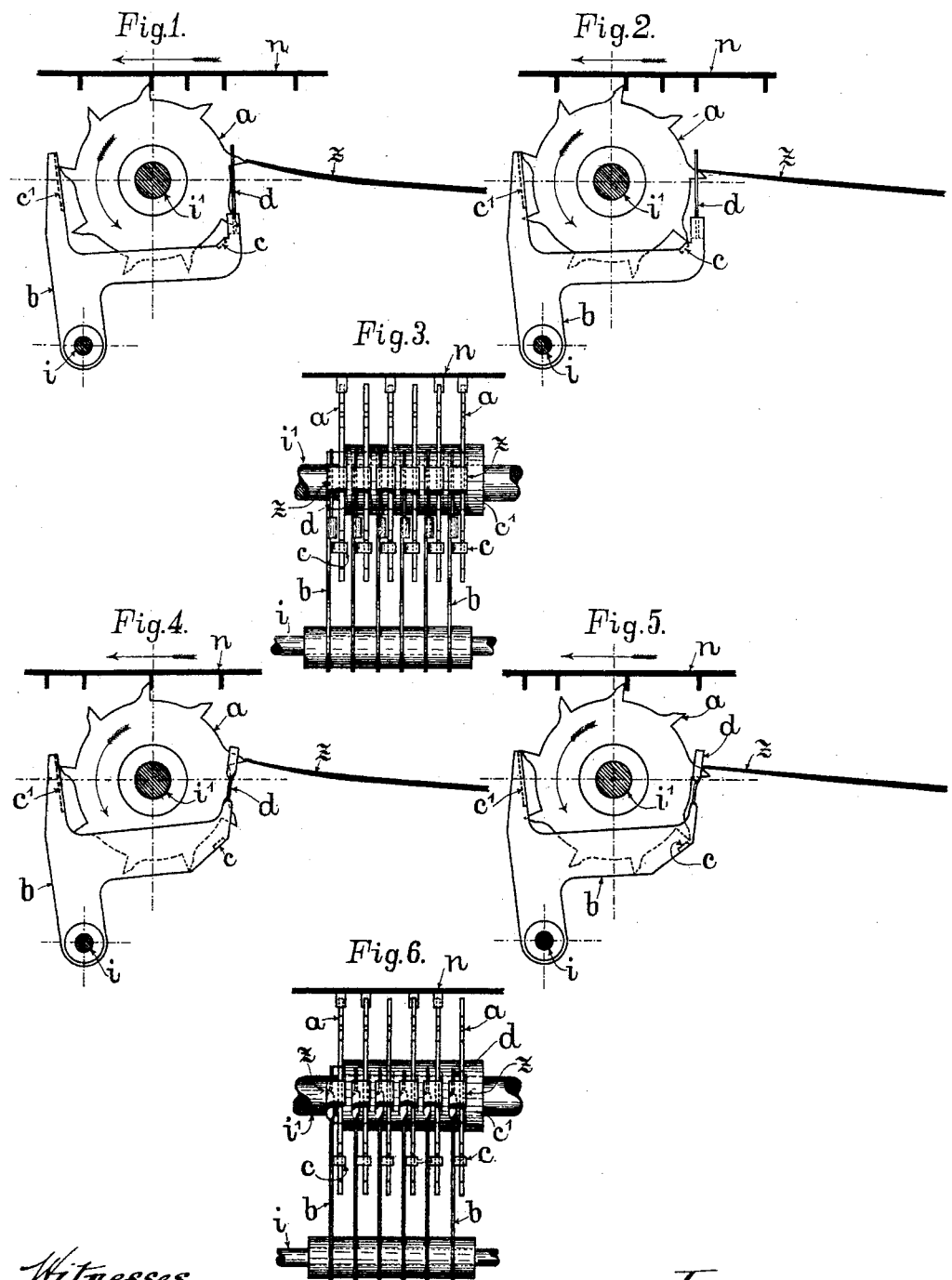

UNITED STATES PATENT OFFICE.

GUSTAV BORTMANN AND REINHOLD MUNKWITZ, OF LEIPSIC, GERMANY.

DAMPER DEVICE FOR MECHANICAL MUSICAL INSTRUMENTS.

SPECIFICATION forming part of Letters Patent No. 599,681, dated March 1, 1898.

Application filed May 8, 1897. Serial No. 635,734. (No model.)

*To all whom it may concern:*

Be it known that we, GUSTAV BORTMANN and REINHOLD MUNKWITZ, subjects of the King of Saxony, residing at Leipsic, Saxony, Germany, have invented certain new and useful Improvements in Damper Arrangements for Mechanical Musical Instruments, of which the following is a specification.

This invention relates to an improved device, shown in the annexed drawings, intended for damping the reeds or tongues of musical boxes.

This device is distinguished from those known for the same purpose by its peculiar construction and secure operation.

Figures 1 and 2 of the drawings show each a side view of the improved damping device with the damper in two different positions. Fig. 3 shows a front view. Figs. 4 and 5 are side views of a damper, modified in shape only, in two different positions; and Fig. 6 a front view of the damping device.

The damping device consists of a rigid lever $b$, arranged alongside an operating-wheel $a$ and turnable on the axle $i$, parallel to the axle of wheel $a$, and provided with a resilient damper $d$, and the two pallets $c$ and $c'$ projecting laterally from the lever $b$ into the plane of the wheel $a$.

The lever $b$ and pallets $c$ and $c'$ are preferably made of steel-plate. The damper $d$ is of flexible resilient steel and stands upon the lever $b$ and is deflected when the damper is pressed on the end of the tongue $z$ while damping the same.

For operating the tongue $z$ the wheels $a$ receive their revolution from the music-sheet $n$.

The damping of the tongue $z$ by means of this device is effected by arranging that for each partial turn given to the wheel $a$ for one operation of the tongue $z$ a tooth of the wheel $a$ passes the pallet $c$ and thus turns (Figs. 2 and 5) the latter, with the lever $b$, a certain distance on the axle $i$, so that by the lever $b$ the damper $d$ is guided to the tongue and thus damps it. Then a second tooth of the wheel $a$ passes the pallet $c'$, whereby (Figs. 1 and 4) the latter, with the lever $b$, is turned back on the axle $i$, and by this revolution of the lever $b$ the damper $d$ is again moved away from the tongue $z$. With this outward movement of the damper $d$ the tongue $z$ is simultaneously operated by a third tooth of the wheel $a$ and gives thus the sound.

In order that the damper $d$ does not fall by itself prematurely on the tongue $z$, the pallet $c'$ is formed in such a manner that the tooth of the wheel $a$ passing the same slides on it during the revolution of the wheel until another tooth of the wheel $a$ begins to pass the pallet $c$ for the movement of the damper $d$ onto the tongue.

We claim as our invention—

In a mechanical musical instrument the combination of a vibratory tongue $z$ a rotary wheel $a$ having teeth adapted to set said tongue in vibration, a vibratory lever $b$ carrying a resilient damper $d$ in the plane of said tongue and pallets $c$ $c'$ on said lever in the plane of wheel $a$ whereby the lever is adapted to be rocked in a plane parallel to the said wheel $a$ by the teeth thereof during a part revolution thereof in order to move the resilient damper against and remove the same from the tongue before the action of a tooth of the wheel upon said tongue.

In testimony whereof we have signed our names to this specification in the presence of two subscribing witnesses.

GUSTAV BORTMANN.
REINHOLD MUNKWITZ.

Witnesses:
JUL. MARQUEZ,
RUDOLPH FRICKE.